US009303368B2

(12) United States Patent
Reda

(10) Patent No.: US 9,303,368 B2
(45) Date of Patent: Apr. 5, 2016

(54) METHOD FOR SCANNING AND REPAIRING ROAD CORROSION AND APPARATUS THEREFOR

(71) Applicant: Shaker Ahmed Reda, Akron, OH (US)

(72) Inventor: Shaker Ahmed Reda, Akron, OH (US)

( * ) Notice: Subject to any disclaimer, the term of this patent is extended or adjusted under 35 U.S.C. 154(b) by 6 days.

(21) Appl. No.: 14/447,080

(22) Filed: Jul. 30, 2014

(65) Prior Publication Data

US 2016/0032536 A1 Feb. 4, 2016

(51) Int. Cl.
| | | |
|---|---|---|
| *E01C 1/00* | (2006.01) | |
| *E01C 11/00* | (2006.01) | |
| *E01C 7/00* | (2006.01) | |
| *E01C 19/00* | (2006.01) | |
| *E01C 19/18* | (2006.01) | |
| *E01C 23/07* | (2006.01) | |
| *G05D 1/00* | (2006.01) | |

(52) U.S. Cl.
CPC ............ *E01C 11/005* (2013.01); *E01C 7/00* (2013.01); *E01C 19/004* (2013.01); *E01C 19/185* (2013.01); *E01C 23/07* (2013.01); *G05D 1/0011* (2013.01)

(58) Field of Classification Search
CPC ....... E01C 7/00; E01C 11/005; E01C 19/004; E01C 19/185; E01C 23/07; G05D 1/001
USPC ............ 404/75, 84.05–84.8, 90–94, 97, 404/101–105, 107–111, 117, 118, 122, 128
See application file for complete search history.

(56) References Cited

U.S. PATENT DOCUMENTS

| | | | | |
|---|---|---|---|---|
| 5,251,999 A | * | 10/1993 | McCracken | E01C 23/06 404/109 |
| 5,584,597 A | * | 12/1996 | Lemelson | E01C 23/07 299/41.1 |
| 5,746,539 A | * | 5/1998 | Mara | E01C 23/07 404/102 |
| 6,161,986 A | * | 12/2000 | Smith | E01C 19/201 222/52 |
| 6,846,128 B2 | * | 1/2005 | Sick | E01C 19/004 404/133.05 |
| 7,033,106 B2 | * | 4/2006 | Harvey | E01C 23/098 404/107 |
| 8,167,513 B2 | * | 5/2012 | Ryan | E01C 23/06 404/101 |
| 2013/0155061 A1 | | 6/2013 | Jahanshahi et al. | |

FOREIGN PATENT DOCUMENTS

| | | |
|---|---|---|
| CN | 202925442 U | 5/2013 |
| WO | WO 2013/096704 A1 | 6/2013 |

OTHER PUBLICATIONS

Deon Joubert, et al., "Pothole Tagging System", http://researchspace.csir.co.za/dspace/bitstream/10204/5384/1/Joubert_2011.pdf.

* cited by examiner

*Primary Examiner* — Raymond W Addie
(74) *Attorney, Agent, or Firm* — Oblon, McClelland, Maier & Neustadt, L.L.P.

(57) ABSTRACT

An apparatus including a multidirectional positioning system and a scanner. The scanner scans the volume of a three-dimensional cavity, and the scanner is attached to the multidirectional positioning system. A processor receives volume data of the cavity and stores the volume data in a data storage memory. A material depositing mechanism is attached to the multidirectional positioning system, and the material depositing mechanism is controlled to move with respect to a shape of the cavity based on the volume data stored in the processor so as to fill in the cavity with a filler material.

20 Claims, 5 Drawing Sheets

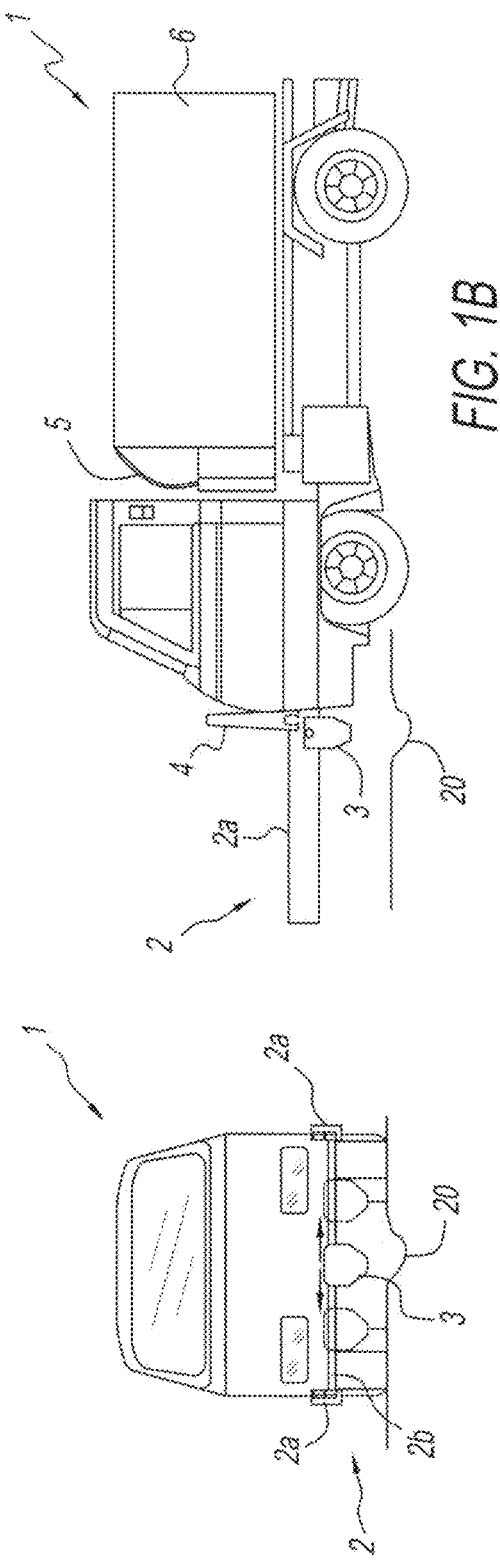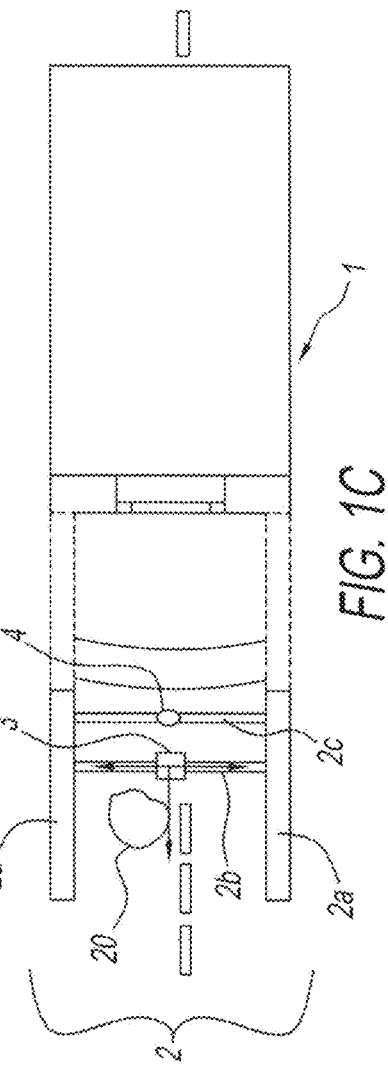

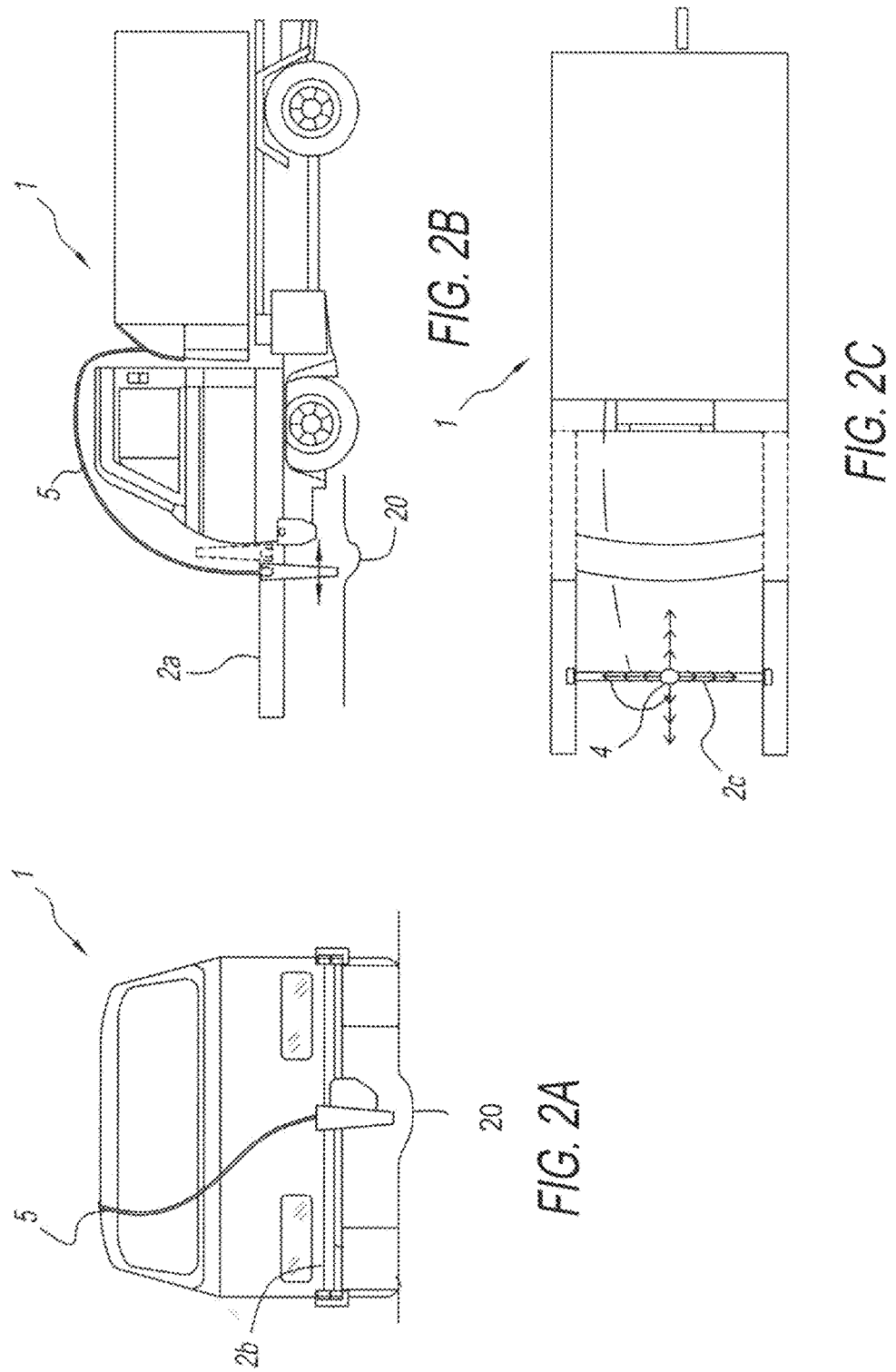

METHOD FOR SCANNING AND REPAIRING ROAD CORROSION AND APPARATUS THEREFOR

BACKGROUND

1. Field

The embodiments discussed herein relate to a method and apparatus for scanning and repair of road corrosion. More specifically, the scanning of the road corrosion may be achieved using a three-dimensional scanning device.

2. Description of the Related Art

Currently, there are a few methods for repairing minor road damage, such as potholes, cracks, or other cavities in the road surface. One method involves applying filler such as asphalt to the damaged area. A vehicle is then driven over it several times until the material is compacted and smooth. Another method of repair involves a patch. For example, a minor pothole, which only impacts the surface layer, might be repaired by removing debris from the hole and then filling it with fresh asphalt. Then, the asphalt is flattened with a heavy roller. Finally, an alternative method, which is more akin to preventing further damage rather than truly repairing the damage, is surface treatment. In surface treatment, contractors may spray old roadways with a protective coating to stop fallout and prevent further crumbling. The seal is sprayed to fill minor cracks and eliminate surface defects. In some instances, the road may be treated with a chemical, which dissolves road matter to reestablish homogeneity.

With the above methods, (particularly in the case of filler and patching), the traditional process for determining the cost to repair the roadway generally involves the following steps. First, the length and width of any holes in the road surface are manually measured with a tape measure. Then, the respective depth of the holes is manually measured from the road surface with a tape measure. From these measurements, the volume of each damaged portion is calculated, and then collectively subtotaled to estimate the total amount of repair material that is needed.

Despite the simplistic appearance of the above steps, there are challenges that complicate the repair process. One challenge encountered is the size and shape of the hole. Holes do not often erode evenly or in simple shapes that would simplify volume calculations and thereby provide more precise estimates of material needs. As such, the three-dimensional measurements become more complex and accuracy is diminished. More specifically, additional measurement points are needed, which adds time and complexity. Another challenge is the skill level of and method of measurement used by the technician making the measurements.

One additional challenge, while related to the repair of the hole, does not deal with the actual repair, but is a secondary problem that occurs due to the method of the repair. This secondary problem is the large amounts of time and space required to enable the repair using the known methods, which leads to roadway congestion, as well as easily-recognizable repair related hazards and unintended consequential hazards accompanying such congestion. For example, the easily-recognizable repair related hazards include health and safety issues for both the drivers and the workers. On the other hand, unintended consequential hazards include long delays which impact the local environment via pollution and additional road surface wear and tear, as well as create an overall loss in economic productivity.

Regardless of the above challenges, once the quantity of material needed is determined, a quality contractor must be selected. However, a good quality contractor may mean an increase in cost. Moreover, if the repair is urgent, rush work may also mean additional cost.

Accordingly, the cost of even minor repairs could be significant for many aspects of the economy depending on the size, urgency, complexity, and availability of a contractor for the work.

Current suggestions for improving this procedure include using more durable paving materials, making repairs during non-rush hours, and managing repairs more closely so as to minimize the duration of road blockage for repair time. None of the suggestions, however, directly solve the problems that exist.

Therefore, as recognized by the present inventor, a need exists for a better, more efficient, and more economic method and apparatus for repairing road damage.

SUMMARY

According to an embodiment of the present invention, the apparatus includes a multidirectional positioning system and a scanner. The scanner scans the volume of a three-dimensional cavity, and the scanner is attached to the multidirectional positioning system. A processor receives volume data of the cavity and stores the volume data in a data storage memory. A material depositing mechanism is attached to the multidirectional positioning system, and the material depositing mechanism is controlled to move with respect to a shape of the cavity based on the volume data stored in the processor so as to fill in the cavity with a filler material.

According to another embodiment, a method includes positioning a scanner over a three-dimensional cavity using a multidirectional positioning system to which the scanner is attached. Next, the volume of the three-dimensional cavity is scanned by moving the scanner across the cavity with the multidirectional positioning system. The volume of the cavity as data is stored in a data storage memory of a processor. The method then calculates a quantity of filler material required to fill the three-dimensional cavity based on the volume data of the cavity scanned. Finally, the cavity is filled with the calculated quantity of filler material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

FIG. 1A is a front view drawing of an apparatus according to an exemplary embodiment of the present disclosure;

FIG. 1B is a side profile view drawing of the apparatus in FIG. 1A according to an exemplary embodiment of the present disclosure;

FIG. 1C is a top view drawing of the apparatus in FIG. 1A according to an exemplary embodiment of the present disclosure;

FIG. 2A is front view drawing of another aspect of the apparatus in FIG. 1A according to an exemplary embodiment of the present disclosure;

FIG. 2B is a side profile view drawing another aspect of the apparatus in FIG. 1A according to an exemplary embodiment of the present disclosure;

FIG. 2C is a top view drawing of another aspect of the apparatus in FIG. 1A according to an exemplary embodiment of the present disclosure;

DETAILED DESCRIPTION

In the following, the present advancement will be discussed by describing a preferred embodiment with reference to the accompanying drawings. However, those skilled in the art will realize other applications and modifications within the scope of the disclosure as defined in the enclosed claims.

FIGS. 1A-1C illustrate front, side, and top view drawings, respectively, of an apparatus for scanning and repairing road corrosion. Reference numbers referring to the same elements in different figures are used throughout the figures.

Figure 3:
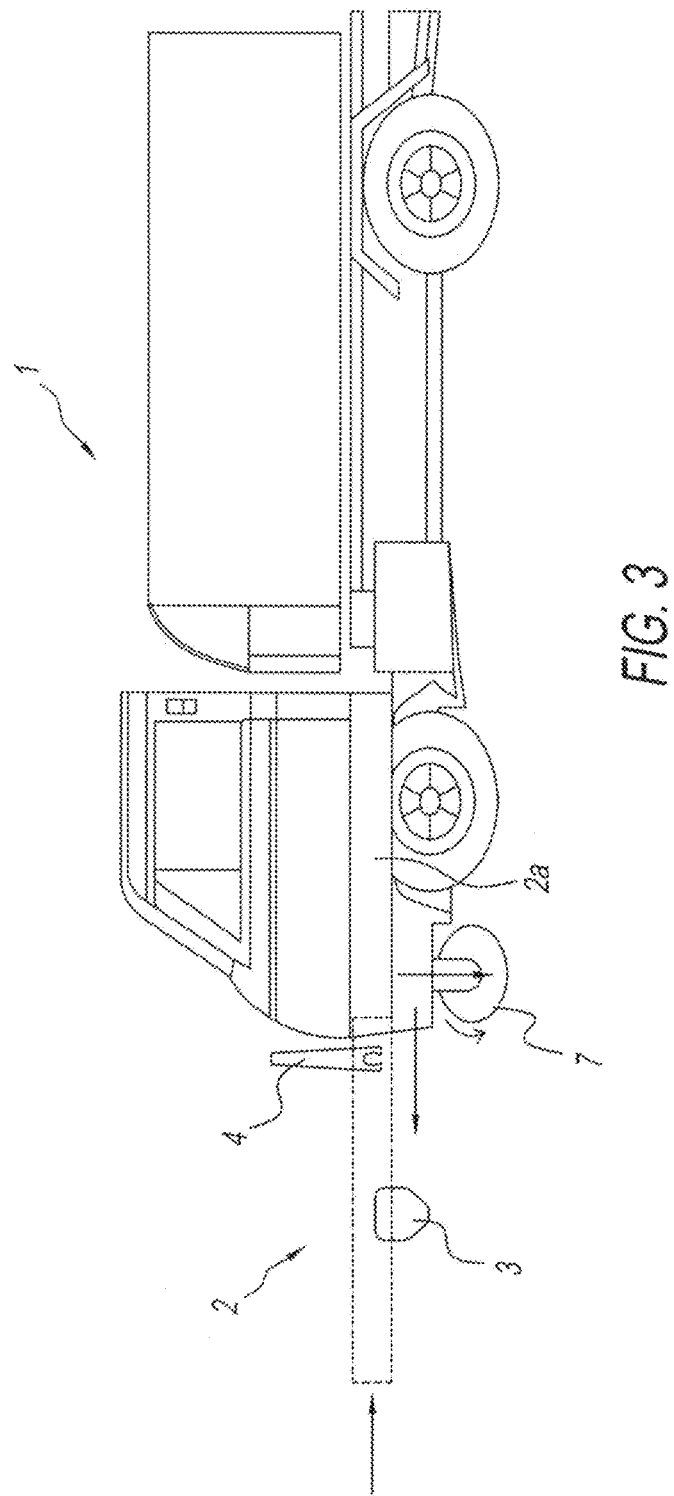
FIG. 3 is a side profile view drawing of another aspect of the apparatus in FIG. 1A according to an exemplary embodiment of the present disclosure.
Figure 4:
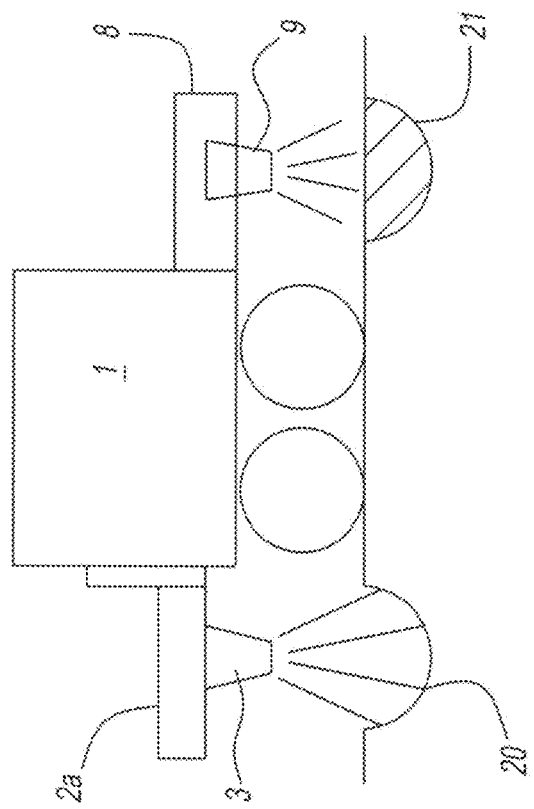
FIG. 4 is a schematic side view drawing of an alternative embodiment according to an exemplary embodiment of the present disclosure.

Generally, as is shown in FIGS. 1-4, a transportation means 1, which in this embodiment is a truck, has connected to a front end thereof a multidirectional positioning system 2 ("MPS"). A three dimensional scanner 3 and a filling head 4 are both attached to the MPS 2. The filling head 4 is further connected to a filling supply conduit 5, which draws filler material 21 from a supply container 6 carried by the transportation means 1. FIG. 3 further depicts a heavy roller 7. The roller 7 may be attached beneath the vehicle, for example, as shown in FIG. 3. However, the roller 7 may be attached to a different location on the transportation means 1 so long as the roller 7 can roll over corrosion 20 during repair thereof.

Figure 5:
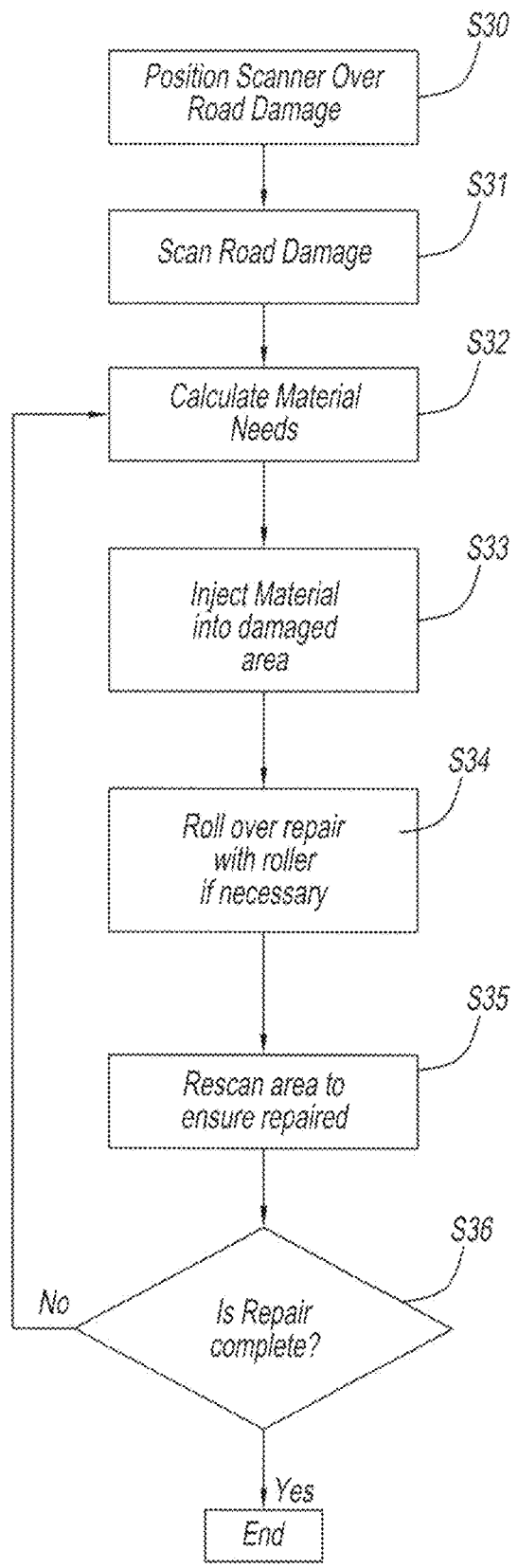
FIG. 5 is a flowchart of the method used according to an exemplary embodiment of the present disclosure.

While the above components are described in more detail herein, the general function of the components in the method of the application is as follows, and is depicted in FIG. 5. The transportation means 1 carries the supply container 6 to an area of a road surface containing road corrosion 20, such as a pothole or other cavity. In step S30, the MPS 2 positions the scanner 3 over the corrosion 20 and scans the corrosion in step S 31 entirely in order to measure the width, depth, and length (X, Y, and X directions) of the corrosion 20, and the scanner 3 may also capture an image thereof. As such, a precise measurement of the volume of the space can be determined in step S32 by a processor, which uses the data and image from the scanner 3 to calculate the proper quantity of filler material 21. Note that in S32, a 3D image of the corrosion may be uploaded to a display screen if requested by the operator or if necessary. This allows the operator to determine if, for example, debris should be removed first or whether to perform the repair at all. Once the needed amount of filler material 21 is calculated, the filling head 4 is positioned over the cavity by the MPS 2 and the material 21 is injected or extruded into the correct locations (i.e., depths, lengths, widths) in the corrosion 20 in the correct amounts precisely, as indicated in step S33.

After filling the cavity of the corrosion 20, the filled corrosion 20 may be rolled in step S34. When rolling, the roller 7 is passed over the filled corrosion 20. After rolling, the repaired corrosion 20 may be rescanned as in step S35 in order to ensure that the area is properly repaired. Finally, it is determined if the repair is complete in S36. If not, then the process returns to S32 to calculate the needed filler material 21. If the repair is complete, the process is finished.

Regarding the specific components used to achieve the above method, the transportation means 1, or truck, depicted in FIGS. 1A-3 is only one non-limiting embodiment of a transportation means 1 for the instant application. In another embodiment, the system may be a small portable machine, or the system may be separately fixed on any vehicle capable of supporting the MPS, in any location that would satisfy.

Alternatively, the transportation means 1 could be an autonomous transport or a remotely controlled transport, such as a robot (FIG. 4) in either case. In particular, a specially configured robot could fulfill this role, where "specially configured" means that the robot is particularly designed and programmed to perform repairs and outfitted with the repair components discussed above, including the MPS 2, as well as others described herein below. For example, the robot may be equipped with an electronic control unit ("ECU") (disposed within the main body of the robot, but not depicted) connected to cameras and other sensory devices. Using the above sensory devices, the robot is programmed to either 1) seek and repair road corrosion completely autonomously once provided with location restrictions and instructions, or 2) be controlled remotely via an operator guiding the robot to road corrosion.

Other possible transportation means 1 need not be entirely mechanically driven. Thus, an alternative example of the transportation means 1 is a push cart that is manually movable, and while able to power or support the scanner 3, the cart itself, i.e., the means of transporting the scanner 3, is merely the manner in which the other components are carried or stabilized.

As for the MPS 2, it includes a pair of lateral rail bars 2a, which extend substantially parallel to each other in a forward direction from opposite sides of the truck. A cross-rail bar 2b extends between the lateral rail bars 2a. The cross-rail bar 2b is slidably movable along a length of the lateral rail bars 2a. As indicated in FIG. 3 by the arrows facing in opposite directions with respect to the ends of the lateral rail bars 2a, the lateral rail bars 2a are simultaneously retractable. The length of extension of the lateral rail bars 2a is substantially equidistant extending together anywhere from a first position to a second position. In the first position, the lateral rail bars 2a are secured along the side of the truck cab. In the second position, the lateral rail bars 2a are extended in front of the transportation means 1 to the fullest extension.

The scanner 3 is connected slidingly to the cross-rail bar 2b. As such, the scanner 3 is movable along the cross-rail bar 2b in a direction orthogonal to the lateral rail bars 2a; and by way of the sliding interconnection between the cross-rail bar 2b and the lateral rail bars 2a, the scanner 3 is also movable in a direction parallel to the lateral rail bars 2a. Accordingly, the scanner 3 is movable in at least two dimensions and positionable anywhere between the lateral rail bars 2a. Finally, the scanner 3 is oriented so that the scanning portion of the scanner 3 faces the ground beneath the lateral rail bars 2a. Note that any known three-dimensional scanner may be attached to the MPS 2, so long as the scanner used provides satisfactory results for calculation purposes. It is preferable that the scanner 3 have the ability to obtain the volume data of the corrosion 20 in both numeric and image formats, so that the data can be processed by a processor having a data storage memory (not depicted) in the transportation means 1 and, if desired, displayed on a display device (not depicted) for review by the operator or the robot, upon receipt of the data. Accordingly, the scanner 3 needs to be capable of least one or both of being physically connected via electronic circuitry to the processor or wirelessly connected to the processor in order to transfer the data captured by the scanner 3.

Like the scanner 3, the filling head 4 is also connected to a cross-rail bar 2c on a first end of the filling head 4, and the second end of the filling head 4 is connected to the filling supply conduit 5, which is connected to the container 6. Also like the scanner 3, the filling head 4 can be positioned anywhere between the lateral rail bars 2a. As such, it is possible to position the filling head 4 over the corrosion 20 and deposit (either via injection or extrusion) the precise amount of filler material 21 needed for any particular spatial coordinate location of the corrosion, based on the volume data obtained by the scanner 3. The filling head 4 may be automatically actuated or controllable via the processor according to the data obtained, and/or, in the event of an error in the data obtained of the corrosion 20, an operator may remotely control the position of the filling head 4 to address the error.

Note, with respect to the electro-mechanical elements of the claimed apparatus, including the connections between the filling head 4, the scanner 3, the MPS 2, and the processor either in the transportation means 1 or in a remote location, may be connected to control the various components via any known wired or wireless method that fulfills the above-stated purposes of transferring actuation commands and data transmission.

Alternative Embodiment

Similar to FIGS. 1A-3, FIG. 4 depicts a transportation means 1, however, the transportation means 1 is a robot. Further, in an alternative embodiment, the robot transportation means 1 also supports a rear MPS 8 and a rear scanner 9. The rear MPS 8 allows the rear scanner 9 to perform a secondary scan of the area that was repaired in order to ensure that the repair is complete and avoid future problems. For example, the image obtained by the rear scanner 9 would be analyzed, and if the image showed that the repair of the road corrosion 20 was inadequate and a small cavity remained, the operator of the transportation means or the robot itself would be able to further repair the corrosion 20.

Obviously, numerous modifications and variations of the present invention are possible in light of the above teachings. It is therefore to be understood that within the scope of the appended claims, the invention may be practiced otherwise than as specifically described herein.

The invention claimed is:

1. An apparatus, comprising:
a multidirectional positioning system on a front of a vehicle and having a pair of lateral rail bars configured to be extendable and retractable in parallel from the front of the vehicle;
a scanner that scans a volume of a three-dimensional cavity, the scanner being attached to the multidirectional positioning system;
a processor that
receives volume data of the cavity corresponding to the scanned volume,
stores the volume data in a data storage memory, and
calculates an amount of filler material required to fill the cavity based on the volume data; and
a material depositing mechanism attached to the multidirectional positioning system, the material depositing mechanism being controlled via the processor to move with respect to a shape of the cavity based on the volume data to fill in the cavity with the calculated amount of filler material.

2. The apparatus according to claim 1, wherein the multidirectional positioning system is connected to transportation means via a rail system.

3. The apparatus according to claim 1, wherein
the multidirectional positioning system further includes a cross-lateral rail bar extending between the lateral rail bars,
wherein the scanner is connected to the cross-lateral rail bar and is slidingly movable along a length of the cross-lateral rail bar in a direction orthogonal to the lateral rail bars, and
wherein the cross-lateral rail bar is slidingly movable along a length of the lateral rail bars in a direction parallel to the lateral rail bars.

4. The apparatus according to claim 3, wherein the pair of lateral rail bars are configured to be fully extended away from the vehicle in a first position and wherein the pair of lateral rail bars are configured to be fully retracted at opposite sides of the vehicle in a second position.

5. The apparatus according to claim 1, further comprising a roller attached to the apparatus for rolling across the cavity subsequent to the cavity being filled.

6. The apparatus according to claim 5, further comprising a supply container for holding the filler material used to fill the cavity via the material depositing mechanism.

7. The apparatus according to claim 6, further comprising a material supply conduit extending from the supply container to supply the filler material to the material depositing mechanism.

8. The apparatus according to claim 1, further comprising:
transportation means for transporting an end of the multidirectional positioning system is connected on a first end thereof for transporting; and
a rear scanner connected to a second end of the transportation means, the second end being opposite the first end, and the rear scanner scanning for gaps in a surface of the filler material deposited where the cavity previously existed.

9. The apparatus according to claim 1, wherein the material depositing mechanism includes at least one of an injector and an extruder.

10. The apparatus according to claim 1, wherein the cavity is road corrosion.

11. The apparatus according to claim 1, further comprising a remotely controllable transportation robot that is directed via GPS coordinates, the multidirectional positioning system being connected to an end of the robot for transporting.

12. The apparatus according to claim 1, further comprising a vehicle, the multidirectional positioning system being connected to an end thereof for transporting.

13. The apparatus of claim 4, wherein the material depositing mechanism is positioned on another cross-lateral bar extending between the lateral rail bars, the another cross-lateral bar being closer in distance to the vehicle than the cross-lateral bar.

14. A method, comprising:
positioning a scanner over a three-dimensional cavity using a multidirectional positioning system to which the scanner is attached, the multidirectional positioning system being positioned on a front of a vehicle and having a pair of lateral rail bars configured to be extendable and retractable in parallel from the front of the vehicle;
scanning a volume of the three-dimensional cavity by moving the scanner across the cavity with the multidirectional positioning system;
generating volume data of the cavity corresponding to the scanned volume;
storing the volume of the cavity as data in a data storage memory of a processor;

calculating, via the processor, an amount of filler material required to fill the three-dimensional cavity based on the volume data of the cavity scanned; and filling, via a material depositing mechanism of the multi-directional positioning system controlled by the processor, the cavity with the calculated quantity of filler material.

15. The method to claim 14, further comprising;

rolling over the filled cavity with a roller; and rescanning the filled cavity to determine whether additional filler material is necessary for repair.

16. The method of claim 14, further comprising rescanning the filled cavity to determine whether the filled cavity is incomplete, wherein, upon a determination that the filled cavity is incomplete, the method further comprises positioning the scanner over an incomplete portion of the filled cavity;

scanning the incomplete portion of the filled cavity;

calculating a volume of the incomplete portion; and filling the incomplete portion with filler material based on the calculated volume of the incomplete portion, and wherein, upon a determination that the filled cavity is complete, the scanner and filling head await further command.

17. The method of claim 16, further comprising rolling over a surface of the filled cavity after filling the incomplete portion.

18. The method of claim 14, wherein the filling of the cavity includes positioning a material depositing mechanism over the cavity; and injecting or extruding filler material into the volume of the cavity via a material supply conduit based on the volume data.

19. The method of claim 14, further comprising displaying a 3D image of the volume of the cavity on a display to an operator based on the volume data obtained during the scanning.

20. The method of claim 14, wherein the positioning of the scanner over the cavity using the multidirectional positioning system includes moving a cross-lateral rail bar extending between a pair of lateral rail bars, the scanner is connected to the cross-lateral rail bar and is slidingly movable along a length of the cross-lateral rail bar in a direction orthogonal to the lateral rail bars, and the cross-lateral rail bar is slidingly movable along a length of the lateral rail bars in a direction parallel to the lateral rail bars.

* * * * *